March 30, 1965 G. A. DYER ETAL 3,176,242

REGULATED FLUX OSCILLATOR HAVING A CONTROLLABLE FREQUENCY

Filed Aug. 4, 1961 2 Sheets-Sheet 1

INVENTORS
GEORGE A. DYER
DANIEL L HOSKINSON
BY Allan Rothenberg
ATORNEY

March 30, 1965 G. A. DYER ETAL 3,176,242

REGULATED FLUX OSCILLATOR HAVING A CONTROLLABLE FREQUENCY

Filed Aug. 4, 1961 2 Sheets-Sheet 2

INVENTORS
GEORGE A. DYER
DANIEL L. HOSKINSON

BY Allan Rothenberg

ATTORNEY

United States Patent Office 3,176,242
Patented Mar. 30, 1965

3,176,242
REGULATED FLUX OSCILLATOR HAVING A CONTROLLABLE FREQUENCY

George A. Dyer, Santa Ana, and Daniel L. Hoskinson, Downey, Calif., assignors to North American Aviation, Inc.

Filed Aug. 4, 1961, Ser. No. 129,271
4 Claims. (Cl. 331—113)

Figure 1:
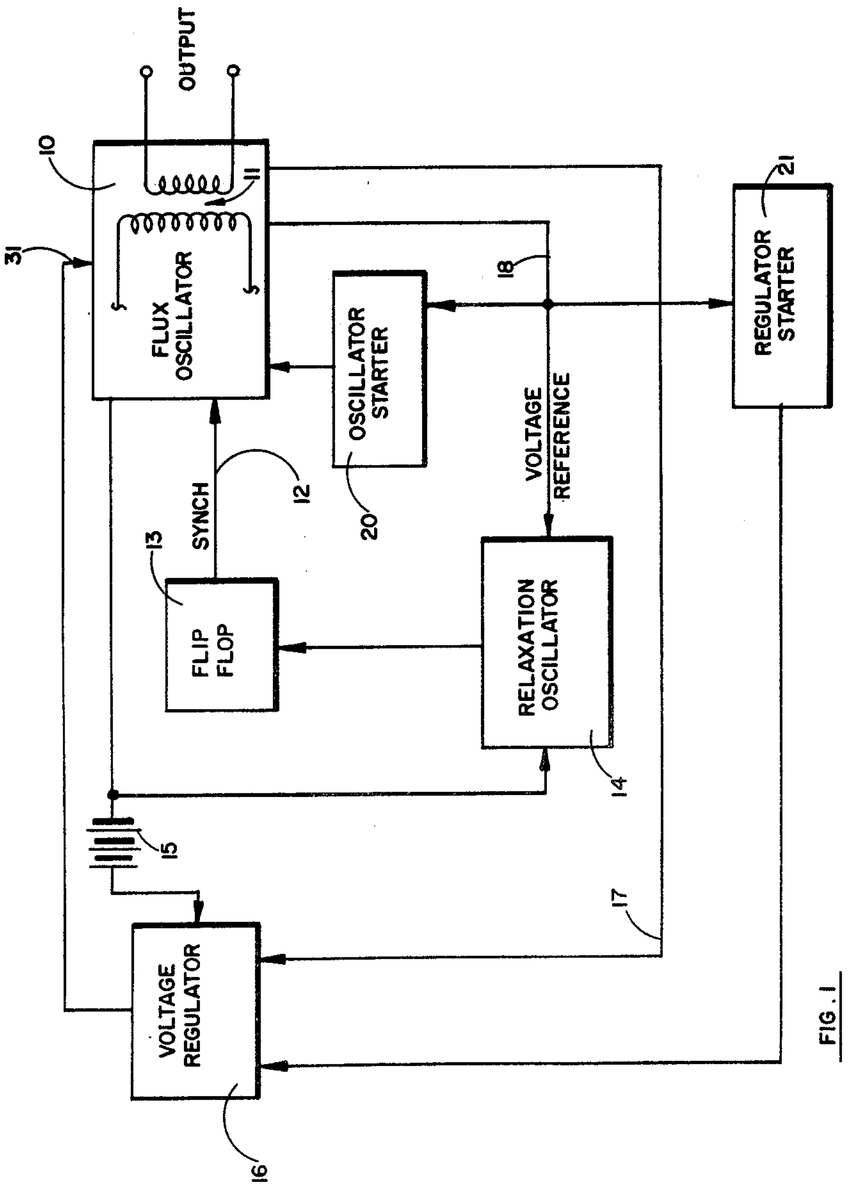

This invention is concerned with the generation of an alternating current wave form and more particularly concerns a square wave generator which is capable of producing an accurately regulated output of precisely controllable frequency.

Alternating current wave forms including square waves have been provided from a direct current source by a type of inverter known as a flux oscillator. Such a flux oscillator includes a pair of interconnected switching transistors connected to opposite ends of one winding of a saturable core transformer with a regenerative feedback provided from the transformer to the respective transistors. While there are many advantages to the use of such flux oscillators for providing square waves, there are also severe drawbacks to the conventional flux oscillator. The frequency of such devices is inherently dependent upon the voltage time characteristics of a saturating core. Accordingly there is little frequency stability available since frequency depends upon the magnitude of the supply voltage, the number of turns of the windings, and also flux saturation level of the core, which may change with temperature. Further, the frequency is not easily variable nor is the output voltage magnitude simply or precisely adjustable without effect on the amplitude of output waveform. Accordingly, it is an object of this invention to provide an improved flux oscillator.

In carrying out the principles of this invention, in accordance with a preferred embodiment thereof, there is provided a flux oscillator having a natural frequency substantially below any of the frequencies at which the device is to be used. Instead of allowing the period of the oscillator to be determined by the transformer and voltage characteristics, the transistors of the oscillator are triggered by pulses provided from a variable frequency relaxation oscillator. Voltage regulation for both line voltage and output load magnitude variations is provided by the use of a voltage regulator which samples a portion of the voltage at the flux oscillator transformer primary and compares this with a voltage reference to provide the direct current potential which energizes the flux oscillator. In order to stabilize frequency where voltage regulation is provided, the frequency controlling relaxation oscillator is operated, not from the regulated voltage supply, but actually from a point on the oscillator transformer winding which has the voltage thereof controlled by the regulator.

Where the flux oscillator is employed to handle large amounts of power, switching transistors are used which are not self-starting because gain is low at the condition near cut off. Further in such an arrangement the voltage regulator itself will require a starting signal. Accordingly, starting circuits responsive to the flux oscillator transformer output are provided to supply starting current to the flux oscillator transistors and to the voltage regulator itself.

To provide increased power and better control of synchronizing pulse width, a flip-flop is interposed between the relaxation oscillator synch pulses and the switching transistors of the flux oscillator.

Another object of this invention is to provide an improved square wave generator of variable frequency and closely regulated output.

Still another object of the invention is to provide a flux oscillator of controllable frequency.

Another object of the invention is to provide a voltage regulator flux oscillator.

A further object of the invention is the provision of a flux oscillator having a frequency which is substantially uneffected by the voltage regulation.

Another object of the invention is to provide a flux oscillator which has a frequency substantially independent of the voltage time characteristics of a saturable core.

Still another object of the invention is to provide an oscillator having a compensated voltage regulator.

A further object of the invention is to provide a square wave generator with improved starting characteristics.

Figure 2:
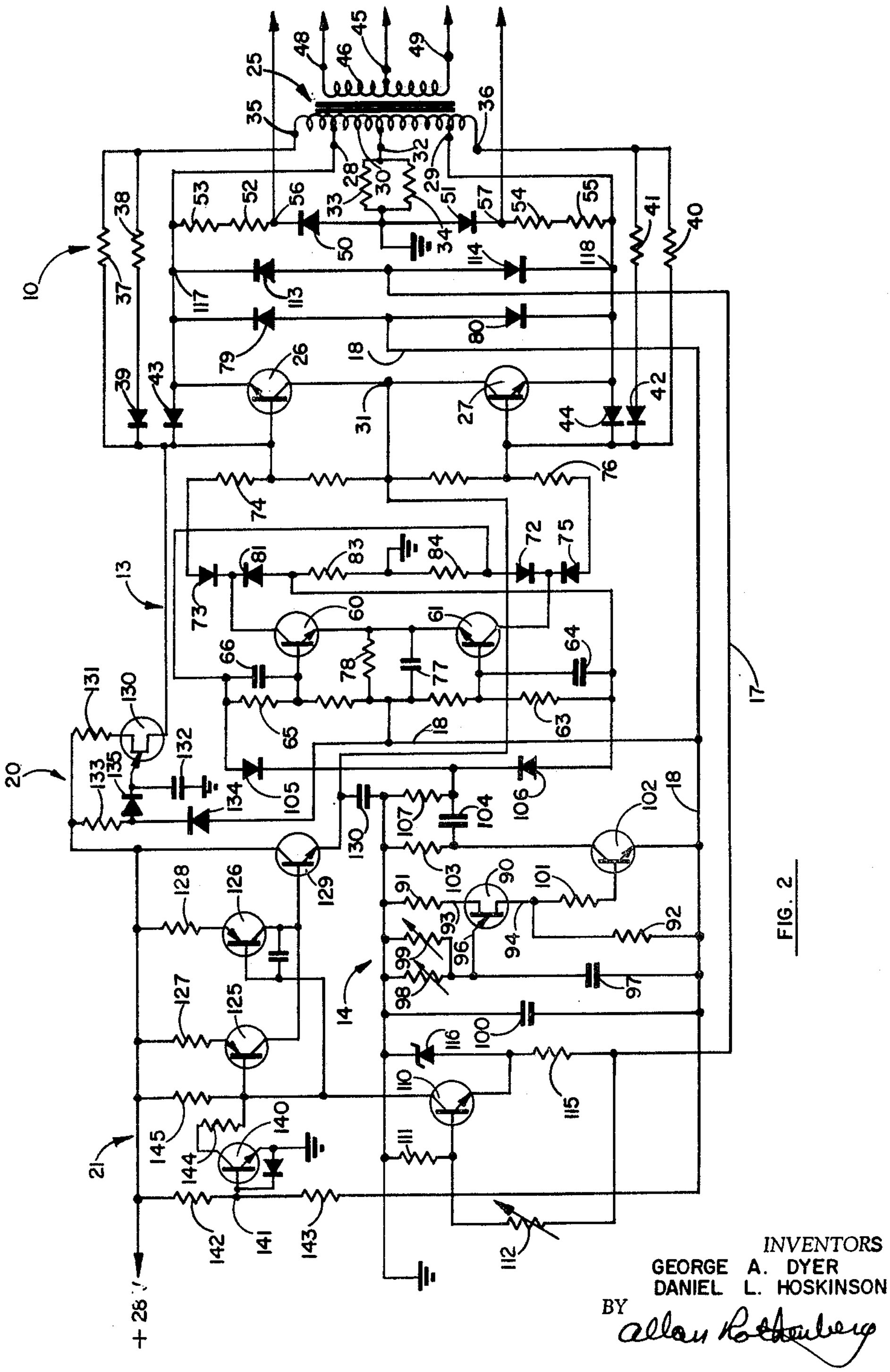

These and other objects of the invention will become apparent from the following descriptions taken in connection with the accompanying drawings wherein:

FIG. 1 is a block diagram of an embodiment of the square wave generator of this invention; and FIG. 2 illustrates the detailed circuitry of the block diagram of FIG 1.

In the drawings like reference characters are used to designate like parts.

As illustrated in FIG. 1, a flux oscillator 10, which includes a transformer 11, is fed with synchronizing pulses via line 12 which effect the switching of the current in the flux oscillator at a time substantially prior to the natural switching which would occur due to saturation of the transformer. The synchronizing pulses on line 12 are provided at the output of a bistable device such as flip-flop 13 which is triggered to alternate states thereof by the output of a relaxation oscillator 14 of variable frequency. The frequency of the relaxation oscillator and, accordingly, the frequency of the synchronizing pulses on line 12, is substantially higher than the natural oscillating frequency of the flux oscillator 10. For example the latter may be arranged to oscillate at a natural frequency on the order of 600 cycles per second whereas the relaxation oscillator frequency may vary between one and five kilocycles per second.

A direct current supply in the form of battery 15 is employed to provide the D.-C. voltage for the oscillator 10. Interposed between the battery 15 and the oscillator 10 is a voltage regulator 16 which controls the D.-C. supply to the flux oscillator at point 31 in response to a feedback voltage received on feedback line 17 from the flux oscillator 10.

The relaxation oscillator charges and discharges to and between potentials provided by the negative side of the D.-C. supply battery 15 and a voltage reference provided on line 18 in the form of a rectified potential derived from the flux oscillator 10. Since the frequency of a relaxation oscillator is dependent upon its supply potential, the voltage reference on line 18 is employed for the relaxation oscillator rather than a regulated voltage as provided from the voltage regulator 16 to the flux oscillator 10. Since the regulated voltage at point 31 would vary with line and load characteristics the frequency of the relaxation oscillator might vary accordingly. However, the flux oscillator does have a point within it which is voltage compensated by the regulator. It is this point which provides the voltage reference on line 18 for the relaxation oscillator which is accordingly made substantially insensitive to the operation of the voltage regulator.

Starting devices 20 and 21 are provided both of which are responsive to the voltage reference on line 18 for providing starting current to the flux oscillator 10 and to the voltage regulator 16 respectively in the absence of operation of the oscillator. When the oscillator 10 is not operating, there is no voltage reference on line 18 and the starters 20 and 21 will accordingly provide the necessary starting signal to the flux oscillator and the regulator.

As illustrated in FIG. 2 the flux oscillator 10 includes a transformer 25 and a pair of transistors 26 and 27 having their collectors interconnected with each other and their emitters respectively connected to end terminals 28 and 29 of the primary winding 30 of the transformer. A regulated direct current voltage is applied to point 31, the common connection of the transistor collectors, from the regulator which will be described below. Further, a positive starting current is applied to the base of transistor 26 from the oscillator starter 20 as will be more particularly described hereinafter. When a positive current is fed to the base of NPN transistor 26, the transistor begins to conduct current which flows from the positive supply of regulator current at point 31 through the transistor, thence through the upper half of transformer primary 30 from terminal 28 to center tap terminal 32 and thence to ground via compensating resistors 33 and 34 which are employed for a purpose to be described more particularly hereinafter. The transformer primary 30 includes, as a part thereof, an upper extension having a terminal 35 and a second extension having a terminal 36 which provide regenerative feedback current to the several transistors by autotransformer action.

As positive current begins to flow from point 31 through transistor 26 and then through a portion of coil 30 from terminal 28 to terminal 32, there is produced in the winding 30 a self-induced voltage which makes terminal 35 more positive than terminal 32. This self-induced voltage from terminal 32 to terminal 35 is accordingly fed via resistors 37 and 38 and a diode 39 to provide base current to the transistor 26 to thereby cause further increased conduction of the transistor. As conduction of the transistor increases, the induced potential from terminal 32 to terminal 35 similarly increases to regeneratively drive the transistor toward saturation. In operation without the synchronization provided by the arrangement of this invention, the transformer core will begin to saturate whereby the potential from terminal 32 to terminal 35 drops toward zero to remove the base drive from transistor 26 whereby the latter starts to conduct less heavily. The decrease in conduction by the autotransformer action would provide a reversal of potential across the winding 30 making terminal 36 more positive than terminal 32 whereby a base drive current would be fed to the base of transistor 27 via resistors 40 and 41 together with a diode 42.

In what will be termed the positive half cycle (wherein transistor 26 conducts) the potential from terminal 32 to terminal 36 is such that there is no forward base current to transistor 27 whereby the latter is cut off. On switching of the oscillator, of course, transistor 27 begins to conduct from point 31 to terminal 29 and thence through terminal 32 to ground while the reversal of potential induced in the transformer winding provides a signal of polarity such as to cut off transistor 26.

Diode 39 provides for limiting of the negative signal on the base of transistor 26 in the negative half cycle, when transistor 27 conducts. On the same negative half cycle, diode 43 connected between the base and the emitter of transistor 26 operates to clamp the base and prevent the base from going too far in the negative direction. A similar clamping diode 44 is provided across the base to emitter of transistor 27 while diode 42 is similar to diode 39 in operation.

As the flux oscillator reverses in its conduction through the primary winding 30, a suitable output signal of a square wave form referenced to a common ground 45 is provided in a secondary 46 of the transformer having end terminals 48 and 49 which provide two square waves of mutually opposite polarity relative to the common terminal 45.

In order to provide an additional square wave output which is referenced to the ground of the flux oscillator without the requiring of an additional winding on the transformer there are employed a pair of diodes 50 and 51 and series resistors 52, 53, 54 and 55 connected between the oscillator ground and the emitters of the respective transistors. A square wave output is provided accordingly at terminals 56 and 57 from the current flowing through the transistors and thence through the resistors 52 and 53 or 54 and 55 respectively.

While the operation of the flux oscillator 10 has been described in its natural frequency which may be, as previously mentioned, on the order of 600 cycles per second, it will be noted that in accordance with the present invention, the core is never allowed to saturate in order to prevent deterioration of the square wave form which would occur upon saturation. Saturation is prevented by applying synchronizing signals to the bases of transistors 26 and 27 such that the one of these two transistors which is conducting will be cut off to effect a switching of the flux oscillator at a time substantially prior to the switching time as determined by the voltage time characteristics of the transformer.

The synchronizing signals to the bases of the driving transistors 26 and 27 of the flux oscillator 10 are provided at the collector outputs of transistors 60 and 61 of a bistable multivibrator or flip-flop generally labeled 12 in FIG. 2. The flip-flop is a conventional circuit having collector-to-base coupling networks in the form of parallel resistance capacitance networks 63, 64, 65 and 66. The collector of transistor 60 is coupled to the base of driving transistor 26 by means of diode 73 and resistor 74 whereby a negative signal will be fed to cut off transistor 26 when the flip-flop 62 shifts to the condition wherein transistor 60 conducts and transistor 61 is cut off. Similarly a negative signal is fed via a diode 75 and resistor 76 to cut off transistor 27 when the flip-flop is shifted to the state wherein transistor 61 conducts.

Both emitters of transistors 60 and 61 of this conventional multivibrator or flip-flop are connected in common via capacitor 77 and resistor 78 which provide bias for the emitters to the voltage reference line 18 which provides the negative voltage of B— for the flip-flop and the relaxation oscillator as will be described below. The voltage reference on line 18 is provided by the rectification, by means of diodes 79 and 80, of the negative half cycles of the flux oscillator 10. Each time that the emitter of a driving transistor 26 or 27 becomes negative, the negative signal is fed via the appropriate diode 79 or 80 to the voltage reference line 18 to provide a negative reference for certain other portions of the system as will be described.

From the description of the synchronizing of the driving transistors 26 and 27 in response to the output of flip-flop 13, it will be seen that transistor 26 conducts together with flip-flop transistor 61, while transistors 60 and 27 conduct together. Further, the transistors of the flip-flop 13 conduct from ground or from the base of the opposite transistors 26 and 27, whichever is more positive, to the B— of the voltage reference on line 18 and the base potential of the flux oscillator transistors may be well above ground. Hence there must be provided some means such as diodes 81 and 72 in the feedback path from collector to base of the several flip-flop transistors to prevent shorting to ground through the resistors 83 and 84 of the base current of that one of driving transistors 26 and 27 which is conducting.

The flip-flop 13 is triggered by pulses from relaxation oscillator 14 which comprises a unijunction transistor 90 having bases 93 and 94 connected between ground and B— line 18 by means of resistors 91 and 92 respectively. The emitter 96 of the unijunction transistor is connected to one side of a timing capacitor 97 of this relaxation oscillator which has its other side connected to B—. The emitter is also connected to ground via adjustable resistors 98 and 99 which, accordingly, will control the frequency of the relaxation oscillator. A filter capacitor 100 of relatively large value is connected between ground and the B— line 18.

As the capacitor 97 charges up toward ground from the relative low B— line through charging resistors 98 and 99, the potential on the emitter 96 of the unijunction transistor increases to a point such that the unijunction transistor provides an extremely low impedance conducting path between its emitter 96 and its base 94 to thereby discharge the capacitor through the resistor 92 and the emitter base junction of the unijunction transistor. The unijunction transistor is a conventional device such as is sold under the designation 2N489. As is well known this unijunction device, also known as a double base diode, will provide conduction from its emitter 96 to the base 94 when the potential across these elements is some fraction, such as 0.6, of the potential across its two bases. Accordingly when the voltage on the timing capacitor 97 reaches a value determined by the device 90, at a time determined by the value of resistors 98, 99 and the capacitor 97 together with the value of B— potential, the capacitor is discharged to provide a positive current pulse through coupling resistor 101 to the base of any amplifying transistor 102. It may be noted that the potential ratio is determined by device 90 so that sensitivity of the relaxation oscillator to changes in B— is reduced.

Amplifying transistor 102, upon conduction through its collector resistor 103, provides a negative current pulse via coupling capacitor 104 and steering diodes 105 and 106 together with resistors 65 and 63 to the respective bases of flip-flop transistors 60 and 61. Accordingly, that one of transistors 60 and 61 which is conducting will be cut off and the flip-flop will change its state at a time determined by the timing of the relaxation oscillator 14. Coupling capacitor 104 has each side thereof connected to ground via resistors 103 and 107 respectively for the purpose of resetting the coupling capacitor charge to ground on both sides thereof between pulses from the relaxation oscillator.

It will be seen that pulses from the relaxation oscillator which is set to provide a frequency substantially greater than the natural frequency of the flux oscillator 10 will be fed to cause the flip-flop 13 to shift at the frequency of the oscillator 14 and thus cause cut off of the driving transistors 26 and 27 at periods substantially shorter than the natural period of the flux oscillator 10. The frequency of the output is one half the repetition rate of the relaxation oscillator.

A regulated voltage is provided by a voltage regulator which includes, as its first stage, a transistor 110 having its base connected to the intermediate point of a voltage divider which comprises a resistor 111 and a variable resistor 112 connected between ground and the line 17 which provides a sampling of the negative half cycles of the flux oscillator. The negative voltage sampling on line 17 is provided via diodes 113 and 114 having their anodes connected in common to the line 17 and their respective cathodes connected to the emitters of the respective driving transistors 26 and 27. It will be noted that the arrangement is such that the connection of the sampling diodes 113 and 114 to the respective emitters of transistors 26 and 27 comprise the points 117, 118 at which the voltage with respect to circuit ground is to be maintained fixed by the voltage regulator.

A second voltage divider has an intermediate point thereof connected to the emitter of voltage transistor 110 and includes a resistor 115 and a Zener reference diode 116. The arrangement is such that the sampled feedback voltage on line 17 is in effect compared with the reference voltage across the Zener diode 116. The regulated voltage on line 17 may be adjusted by variation of resistor 112. The voltage signal on the base of transistor 110 is of course a function of and directly proportional to the feedback voltage on line 17 and also is a function of the adjustable resistor 112.

In operation, when the negative voltage at point 117 or point 118 decreases in magnitude and becomes less negative transistor 110 begins to conduct more heavily to provide a negative going potential at its collector which is connected via a resistor 145 to an unregulated source of D.-C. potential such as +28 volts. The negative going signal at the collector of transistor 110 is fed to the bases of each of a pair of PNP transistors 125 and 126 comprising the second stage of the regulator. Transistors 125 and 126 have their emitters connected to the source of positive potential by means of resistors 127, 128 respectively. Accordingly the negative signal to the base of transistors 125 and 126 causes a positive current to flow from the collectors thereof which is sent to the base of a third stage NPN power transistor 129 which is series connected between the positive source of +28 volts and the flux oscillator 10 at point 31 thereof. Accordingly the increased conduction of power transistor 129 provides for an increase in voltage provided at the point 31 whereby the driving transistors 26 and 27 can conduct more heavily to provide a greater voltage at the regulated points 117 and 118 in response to the lesser voltage sampled on line 17.

A filter capacitor 130 is connected between the emitter of regulator transistor 129 and ground for the purpose of smoothing or filtering the D.-C. voltage at point 31.

Since the desired output of the system of this invention will have a separate ground such as that provided by the terminal 45 on the secondary of flux oscillator transformer 25, a full feedback to the voltage regulator would be most directly provided by the use of an additional transformer. However, in order to avoid this additional transformer, the feedback sampling is done at the unloaded side of the transformer wherefore the arrangement of the present invention employs proportional current compensation by means of the use of resistors 33 and 34 connected between ground and the center-tap 32 of the transformer primary.

Should the load impedance decrease or load current increase the primary of the transformer 25 will draw an increased current to effect an increase in the drop through the transformer from the primary to the secondary. This drop would produce an error in the voltage regulation since the sampling of the voltage for providing a feedback to the voltage regulator is performed at points 117 and 118 on the unloaded side of the transformer. The use of the resistors 33 and 34 in the illustrated arrangement provide a compensation for this reflected voltage drop. The resistors 33 and 34 are employed to compensate the voltage regulator or, more particularly, the sampled voltage employed therefor in such a manner that the voltage regulator will give an increased voltage across that half of the primary which is driving which increase is proportional to the combined resistance of resistors 33 and 34 and to the primary current, or load current. This larger voltage provided by means of the compensatory resistors 33 and 34 thus makes up for the increased transformer drop due to the increased load current.

Nothing that the device samples at point 118 for example, on negative half cycles, the sampling thus will occur when the terminal 32 is positive with respect to terminal 29 whereas on all half cycles the potential across resistors 33 and 34 is such that point 32 is positive with respect to ground since the current flows from terminal 32 to ground in the same direction on both half cycles. It will be noted accordingly that the potential across the resistors 33 and 34 is always in a direction opposite to the sampled potential across terminals 32 and 29 wherein the latter always is negative with respect to the former during the sampling of the negative half cycle. Accordingly the sampling at point 118 is of the algebraic sum or actually, because of the relative polarities, the sampling is of the difference between the potential drop across resistors 33 and 34 and the potential from transformer terminals 32 to 29.

The resistance of resistors 33 and 34 as connected in parallel is made equal to the effective series resistance of the transformer when reflected to the primary winding between terminals 32 and 29. Accordingly, when there is an increase in current through the primary winding 30 (which is due to an increase in load current) the negative value of the sampled voltage will decrease since the bucking voltage across resistors 33, 34 increases to a greater extent than does the voltage between terminals 32 and 29. Note that the sampled voltage is the voltage from transformer terminal 29 to the ground terminal. When sampling on the other half cycle the sampled voltage is that from terminal 28 to ground. Accordingly the increase in load gives an increase in current which provides a decrease in the magnitude of the voltage sampled at either point 117 or 118. A decrease in the magnitude of this negative voltage as previously described will provide an increased current through the regulated transistor 110 and cause regulator transistor 129 to conduct more heavily to provide a greater voltage at point 31. The increased voltage at point 31 thus increases the output voltage to take care of the increased load current and more particularly to take care of the increased loss due to the increase of voltage drop across the transformer. Hence compensation for sampling at the unloaded side of the transformer is achieved.

For the purpose of providing starting current for the flux oscillator, in those situations where the transistors 26 and 27 are of such a nature as to provide insufficient current themselves when initially turned on, there is provided the oscillator starter 20 which comprises a unijunction transistor 130 having one base thereof coupled by resistor 131 to the positive supply and the other base thereof coupled directly to the base of transistor 26. The emitter of the unijunction transistor is connected to a storage capacitor 132 which has its other side connected to ground and is also connected by means of a diode 135 to the intermediate point of a voltage divider comprising resistors 133 and Zener reference diode 134. Zener reference diode 134 has the anode thereof connected to the B− line 18 which is the voltage reference derived from rectification of the signal at the primary 30 of the flux oscillator transformer 25. If the flux oscillator is not operating, there is no negative voltage on line 18 and Zener diode 134 will not conduct. Accordingly, a positive signal is fed through resistor 133 and diode 135 to charge capacitor 132. When the charge on the capacitor reaches a predetermined value, the unijunction transistor conducts from its emitter to that one of its bases which is connected to transistor 26 providing to the latter a starting base current. As the flux oscillator starts to operate a negative voltage is provided on voltage reference line 18 whereby the Zener reference diode 134 conducts, making the anode of diode 135 negative with respect to ground which prevents the capacitor 132 from charging to a value sufficient to cause conduction of unijunction 130. Thus the starting circuit 20 is not operable when a negative voltage of proper magnitude is provided on the voltage reference line 18.

Voltage regulator starter 21 comprises a transistor 140 having its base connected to the intermediate junction 141 of a voltage divider comprising resistors 142 and 143 which are connected respectively to the source of positive potential and to the voltage reference line 18. The collector of transistor 140 is connected by a resistor 144 to the bases of voltage regulator transistors 125 and 126. In the absence of a negative signal from voltage reference line 18, the base of transistor 140 is positive whereby this NPN transistor conducts to provide a voltage drop across resistor 145 and thus supply the necessary negative going signal to the bases of PNP transistors 125 and 126. The latter accordingly will conduct to provide base current to the voltage regulator 129 and the latter is turned on to provide regulated D.-C. to the flux oscillator.

When the flux oscillator starts to operate and proper negative voltage is provided on voltage reference line 18, the starter transistor 140 is not operating and the potential on the bases of transistors 125 and 126 is then controlled as previosuly described by the transistor 110 in response to the feedback voltage on the feedback line 17.

It will be seen that the relaxation oscillator 14 which controls the frequency of the entire system is dependent upon neither the unregulated B+ of the positive supply nor upon the output of the voltage regulator which itself will vary. Rather the relaxation oscillator 14 is connected to the common ground on the one side and on the other side thereof is connected to the regulated voltage points 117 and 118 by means of the diodes 79 and 80. Accordingly, the line 18 will provide a voltage to the relaxation oscillator which does not vary since variations are compensated at points 117 and 118 by the operation of the voltage regulator. By reason of this arrangement an increased frequency precision is obtained.

It will be seen that there has been described in detail the circuitry of an improved voltage controlled variable frequency square wave generator which employs a flux oscillator and obtains the advantages thereof while avoiding the disadvantages inherent in a saturating core device. The arrangement is such that the flux oscillator is provided with a precisely controllable frequency and an accurately regulated magnitude. The frequency control at the same time operates to prevent saturation of the core by switching the driving transistors at the periods substantially less than the natural period of the flux oscillator. The voltage regulator includes an improved compensation scheme for providing regulation both for line variation and load variation while at the same time sampling voltage on the unloaded side of the output transformer. The interrelation of the major components, voltage regulator, flux oscillator and relaxation oscillator is such that maximum enhancement of frequency stability of the system is achieved.

While the invention has been described and illustrated in detail, it is to be clearly understood that the same is by way of illustration and example only and is not to be taken by way of limitation, the spirit and scope of this invention being limited only by the terms of the appended claims.

We claim:

1. A square wave generator comprising a flux oscillator having a saturable transformer having a primary winding, a source of direct current supply, a voltage regulator responsive to said supply and to current in said primary winding for providing a regulated D.C. potential to the oscillator, means connected to said primary winding for providing a reference potential, a timing resistor and capacitor series connected between a point of fixed potential and said reference potential, means connected to a junction between said capacitor and resistor for discharging the capacitor through a low impedance path as said capacitor is charged to a predetermined fraction of the difference between said fixed and reference potential, and means responsive to the discharging of the capacitor for providing synchronizing signals to the flux oscillator.

2. A variable frequency square wave generator comprising a flux oscillator including a center-tapped primary transformer winding and a pair of transistors each having its collector and emitter electrodes connected in series between an end of said center tapped primary winding and a regulated potential, said oscillator including autotransformer extensions of the primary winding connected to provide feedback connections to the respective base electrodes of said transistors, a resistor connected between said center tap and a point of fixed potential, first and second pairs of mutually interconnected and oppositely poled diodes respectively connected to opposite ends of said center-tapped primary winding a source of D.C. supply, a voltage regulator responsively connected to the interconnection of the diodes of the first pair and to said source for providing said regulated potential to the oscillator, a higher frequency oscillator comprising a resistor and a capacitor series connected between the point of fixed potential and the interconnection between the diodes of the second pair, a bistable means coupled to the high frequency oscillator and connected to the flux oscillator for synchronizing operation of the latter with the former, and first and second starter means responsive to said supply and to said interconnection of the diodes of the second pair for providing starting signals to said regulator and to said flux oscillator transistors.

3. A voltage regulated and synchronized square wave generator comprising a transformer having a center-tapped primary winding, means coupling the center tap of said primary winding to a point of fixed potential, means for producing a regulated direct-current voltage, a first transistor having its collector and emitter electrodes connected in series between said voltage regulating means and one end of said primary winding, a second transistor having its collector and emitter electrodes connected in series between said voltage regulating means and the other end of said primary winding, first and second inductive means, each coupled to said primary winding, for providing regenerative signals to the base electrodes of said first and second transistors, respectively, first rectifying means for translating a feedback signal from said transformer to said voltage regulating means, a higher frequency oscillator producing output pulses at a frequency substantially higher than an unsynchronized square wave output from said transformer, and signal translating means for translating said output pulses from said higher frequency oscillator to the base electrodes of said first and second transistors to synchronize the square wave output from said transformer, said signal translating means including a flip-flop having one output terminal coupled to the base electrode of said first transistor and a complementary output terminal coupled to the base electrode of said second transistor, and two steering diodes coupling the output pulses from said higher frequency oscillator to the complementary input terminals of said flip-flop.

4. A voltage regulated and synchronized square wave generator as defined by claim 3 including second rectifying means for translating a reference signal from said transformer to said higher frequency oscillator in order to vary a supply voltage therein and thereby stabilize its operation.

References Cited by the Examiner

UNITED STATES PATENTS

| | | | |
|---|---|---|---|
| 2,064,019 | 12/36 | Little | 328—267 |
| 2,866,944 | 12/58 | Zelina | 331—113 XR |
| 2,950,446 | 8/60 | Humez et al. | |
| 2,968,738 | 1/61 | Pintell | 331—113 |
| 2,970,301 | 1/61 | Rochelle | 331—47 XR |
| 2,990,519 | 6/61 | Wagner | 331—113 |
| 3,002,142 | 9/61 | Jensen | 331—47 XR |
| 3,004,206 | 10/61 | Sheffet | 331—113 |
| 3,038,127 | 6/62 | Wofford | 331—113 |

FOREIGN PATENTS

| | | |
|---|---|---|
| 826,783 | 1/60 | Great Britain. |

ROY LAKE, *Primary Examiner.*

ARTHUR GAUSS, *Examiner.*